(12) United States Patent
Rhee et al.

(10) Patent No.: US 7,535,966 B2
(45) Date of Patent: May 19, 2009

(54) DSL DATA COLLECTION SYSTEM

(75) Inventors: Wonjong Rhee, Palo Alto, CA (US); John M. Cioffi, Atherton, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 896 days.

(21) Appl. No.: 10/919,620

(22) Filed: Aug. 17, 2004

(65) Prior Publication Data

US 2006/0039486 A1 Feb. 23, 2006

(51) Int. Cl.
*H04L 27/00* (2006.01)
*H04M 11/00* (2006.01)

(52) U.S. Cl. .................... 375/260; 379/90.01
(58) Field of Classification Search .............. 375/260, 375/259; 379/90.01
See application file for complete search history.

(56) References Cited

U.S. PATENT DOCUMENTS

| | | | |
|---|---|---|---|
| 6,590,893 B1 | 7/2003 | Hwang et al. | |
| 6,657,997 B1 | 12/2003 | Lide et al. | |
| 6,732,281 B1 | 5/2004 | Mantri et al. | |
| 6,747,992 B1 | 6/2004 | Matsumoto | |
| 6,754,261 B1 | 6/2004 | Liu et al. | |
| 2002/0032761 A1 | 3/2002 | Aoyagi et al. | |
| 2002/0071440 A1 | 6/2002 | Cerami et al. | |
| 2002/0165969 A1* | 11/2002 | Gallant | 709/227 |
| 2003/0101243 A1 | 5/2003 | Donohue et al. | |
| 2003/0169781 A1 | 9/2003 | Duggan | |
| 2004/0027992 A1* | 2/2004 | Volkening et al. | 370/241 |
| 2004/0264439 A1 | 12/2004 | Doherty et al. | |
| 2005/0240381 A1* | 10/2005 | Seiler et al. | 703/1 |
| 2005/0277408 A1 | 12/2005 | Stuckman et al. | |

FOREIGN PATENT DOCUMENTS

GB 2 315 188 A 1/1998

OTHER PUBLICATIONS

Written Opinion of International Searching Authority, International Application No. PCT/IB2005/002571 (17 pgs).
Nichols et al., "Definition of the Differentiated Services Field (DS Field) in the IPv4 and IPv6 Headers," IETF Standard, Internet Engineering Task Force, IETF, CH, Dec. 1998, ISSN: 0000-0003, Chapter 3. Differentiated Services Field Definition. Reference No. XP-015008258. (21 pages).

(Continued)

*Primary Examiner*—Kevin M Burd
(74) *Attorney, Agent, or Firm*—Blakely Sokoloff Taylor & Zafman LLP

(57) ABSTRACT

Information is sent by a DSL system component using a non-disruptive operational data parameter. One or more bits of the non-disruptive operational data parameter are used to send other information. In some instances the selected parameter will be an unused parameter, such as an unused fast operational mode or interleaved operational mode parameter used to report operational data in a DSL system. In one embodiment of the invention, a remote modem provides a unique equipment identifier that can be paired with the telephone number on which the modem is operating. Verification of and/or searching for the correct pairing of telephone number and unique equipment identifier can be performed as well.

26 Claims, 6 Drawing Sheets

OTHER PUBLICATIONS

Database WPI; Section EI, Week 200282; Derwent Publications Ltd., London, GB; AN 2002-758035; Reference No. XP-002392505. [& KR 2002 048 603 A (LG Electronics Inc.) Jun. 24, 2002]. (1 page).
International Search Report, International Application No. PCT/IB2005/002571 (7 pgs).
"ADSL Network Element Management" Technical Report TR-069, Mar. 1998, pp. 1-27, (a provided by International Searching Authority). Reference No. XP-002369297. (27 pages).
Invitation to Pay Additional Fees, International Application No. PCT/IB2005/002571 (9 pgs).

Oakley et al., "Passive fibre local loop for telephony with broadband upgrade," Sep. 11, 1988, pp. 179-183, Reference No. XP-010071884. (5 pages).
Young-Yul et al., "Dynamic bandwidth management for VBR MPEG traffic using ATM OAM cell," Information Networking, 1998; (ICOIN-12); Proceedings, Twelfth International Conference on Tokyo, Japan; Jan. 21-23, 1998; Los Alamitos, CA, USA; IEEE Computer Soc. US, Jan. 21, 1998, ISBN 0-8186-7225-0; Reference No. XP-010265294. (5 pages).

* cited by examiner

DSL DATA COLLECTION SYSTEM

CROSS-REFERENCE TO RELATED APPLICATION

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

1. Field of the Invention

This invention relates generally to methods, systems and apparatus for managing digital communications systems. More specifically, this invention relates to collecting data and information from modems and/or other components in a DSL system or the like. Even more specifically, at least one embodiment of this invention includes methods and apparatus for collecting a unique equipment identifier of a modem (such as the modem's serial number) so that the identifier can be matched to the telephone number representing the line on which the modem is operating.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

While some data and/or information is available using existing data management in DSL systems, other types of data may be difficult or impossible to obtain for an operator, controller or other party. More generally, transmission of information between DSL system components can significantly enhance performance and/or services provided to users in a DSL system. As noted below, some types of data are exchanged or otherwise available within certain parameters established according to various standards and the like. However, as noted below with regard to the example of matching a modem identifier and a telephone number of a loop on which the modem is operating, there is no simple way to obtain some types of data.

The subscriber line (or loop) is associated with a telephone number. This number is known to the telephone company and is one of the ways by which the telephone company maintains records of user activities and account status. Moreover, each modem is an electronic device that has one or more unique identifying codes or numbers, such as a serial number and/or other identifier. A modem having one or more unique equipment identifiers (or "UEIs") may be used on any number of different lines over time, thus being associated with a different telephone number on each different DSL line to which the modem is coupled. For example, after use with a first telephone number, the modem may then be disconnected and later used in connection with a different telephone number at a later time. Thus, even though a telephone number is always associated with its line and the modem always is associated with its one or more UEIs, reliably matching the modem and line (for example, by matching the telephone number and modem UEI) has been a problem, particularly in DSL systems.

When a controller such as a dynamic spectrum manager or DSM Center communicates with a remote DSL modem over the Internet or otherwise, the remote modem cannot discover on its own what telephone number is assigned to the line on which the remote modem is operating (though the remote modem does know its UEI(s)—(serial number, MAC address (Medium Access Control Address), Ethernet address and/or other unique identifier). The remote modem can only trust that a user or other person has correctly entered the proper telephone number into the remote modem and/or any other information source used in the DSL system. If the wrong telephone number is entered or, for example, a previous phone number is retained and not updated when a user changes phone lines or locations, the controller and/or others may be provided with the wrong telephone number. This can lead to problems when the controller attempts to access the remote modem's loop through the phone company, since it is important that the controller use the correct telephone number.

To date, however, there has been no reliable way for a party (the controller or phone company, for example) to match and/or update the serial number/telephone number pairing with any real assurance that the proper pairing is being made. Currently, a technician or other individual must manually enter the telephone number and serial number of a modem into a data record. This typically is done only when the individual is making a service call or the like at the user's location. Thus, the process has been dependent upon (and has suffered from) human error in establishing records and does not have a simple way to maintain those records. Furthermore, serial number reporting mechanisms within the element management of DSL systems, supposedly mandated by standards like the ITU G.992.1 ADSL1 standard, are largely dysfunctional because of misunderstandings of formats for reporting, ignorance by vendors of correct procedure, and particularly no previous testing of compliance of serial number reporting in element-management systems.

Systems, methods and techniques that permit transmission of information within a DSL system without disrupting normal operation of the DSL system, especially information that usually is not available to system components would represent a significant advancement in the art. Also, systems, methods and techniques that permit a DSL system controller such as a DSM Center to collect and/or exchange various types of data and/or information from and/or with system components without disrupting service in the system would represent a significant advancement in the art. More specifically, systems, methods and techniques that permit such a controller to identify remote modems by an accurate UEI/telephone number pairing and to update such pairing as appropriate would represent a significant advancement in the art. In particular, systems that allow a party to identify the accurate identifier/telephone number pairing without disrupting service to a user would represent a considerable advancement in the field of DSL service rates and associated ranges.

BRIEF SUMMARY OF THE INVENTION

Information is sent by a DSL system component using a non-disruptive operational data parameter. One or more bits of the non-disruptive operational data parameter are used to send other information. In some instances the selected parameter will be an unused parameter, such as an unused fast operational mode or interleaved operational mode parameter used to report operational data in a DSL system. In one embodiment of the invention, a remote modem provides a unique equipment identifier that can be paired with the telephone number on which the modem is operating. Verification of and/or searching for the correct pairing of telephone number and unique equipment identifier can be performed as well.

More specifically, in one embodiment of the invention, a DSL system component is instructed to send information using a non-disruptive operational data parameter. The component identifies an appropriate parameter and assigns at least some of the requested information to one or more bits of the selected non-disruptive operational data parameter, thus amending the parameter. The amended operational data parameter is then sent by the component to transmit the requested information. The information may be sought by a controller such as a DSM Center or the like. In the case of a DSL system, the component may be a modem operating within the DSL system.

In more specific embodiments of the present invention, a controller or the like may wish to find and/or confirm a pairing of a DSL line telephone number and the unique equipment identifier (UEI) data of the remote modem using the line. In one embodiment the controller instructs the remote modem to send its UEI data. The controller knows the telephone number associated with the DSL line. The remote modem identifies and/or selects a non-disruptive operational data parameter and transmits its UEI data using the selected parameter. The remote modem may either requisition one or more bits of an operational data parameter in use by the DSL system or may select an operational data parameter. In either case, the UEI data is appended to the selected operational data parameter in a manner that avoids disruption of the normal operation of the DSL system to generate an amended operational data parameter. The amended operational data parameter is sent to the controller either directly or via a DSL system MIB or other database. In an alternate embodiment an ATU-C modem sends the telephone number of the line on which it operates to its ATU-R modem counterpart. The ATU-R appends its UEI data to the telephone number and transmits the pair. The pairing can be received by the ATU-C, a controller or another DSL system component, such as an MIB or other database.

To assist in verifying and/or searching for the correct information, operational data markers may be used. Also, correlation techniques may be used as well.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

Figure 1:
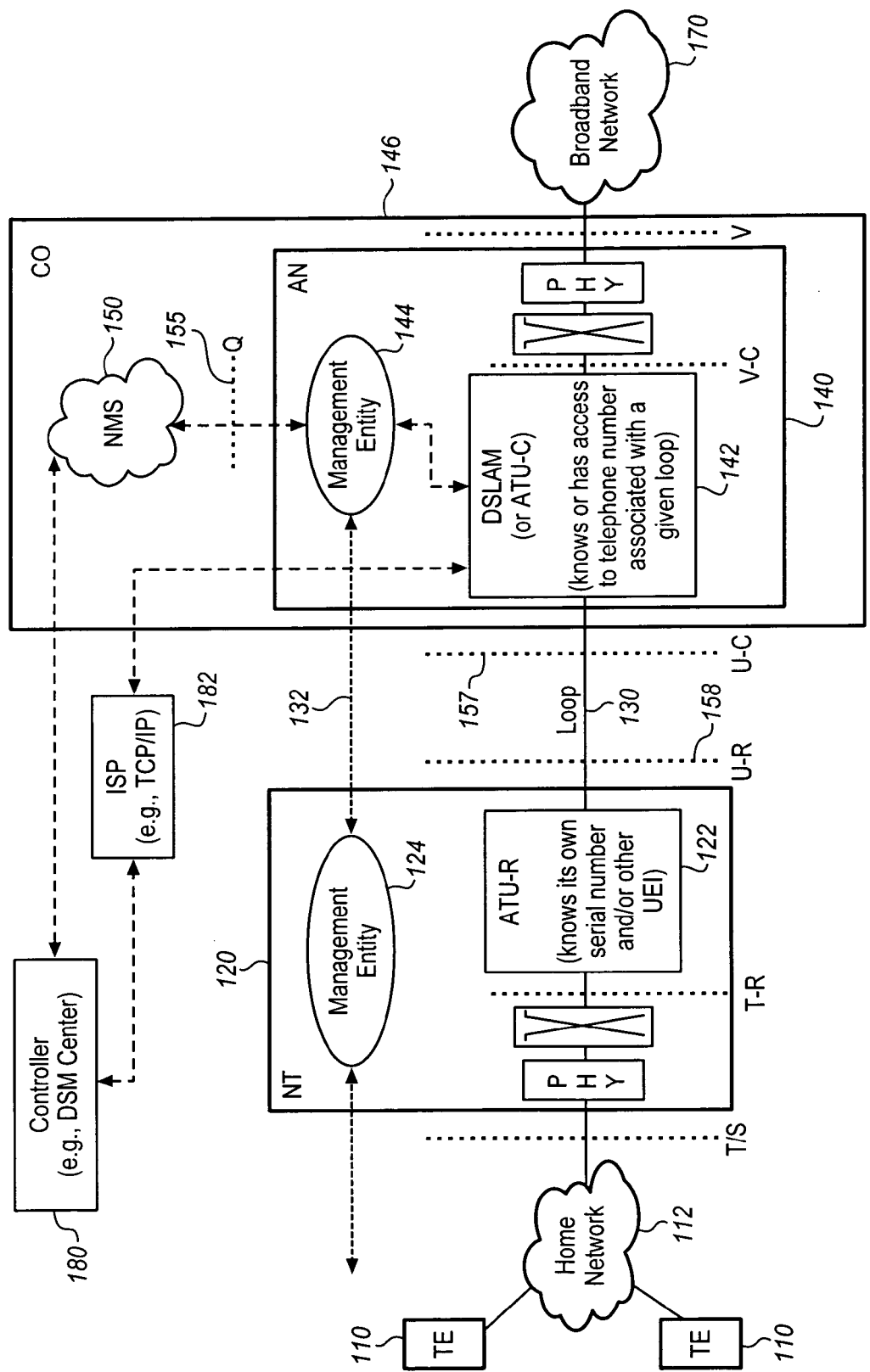
FIG. 1 is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention permit components in a DSL system and the like to collect and/or exchange data and/or information, especially data and/or information that might not be otherwise available from standard data maintenance and management procedures. Other embodiments of the present invention permit transmission of information (especially information not typically carried or transmitted as part of the normal operational data of the system) from a DSL system component without disrupting normal operation of the DSL system. The component uses one or more operational data parameters to report operational data by identifying a non-disruptive operational data parameter, assigning at least part of the information to one or more bits of the non-disruptive operational data parameter in a manner that avoids disrupting normal operation of the DSL system to generate an amended operational data parameter, and then sending the amended operational data parameter comprising at least part of the information. From the specific examples presented below, those skilled in the art will recognize that the present invention can be used in a wide variety of circumstances and is not limited solely to the exemplary descriptions provided herein.

In a specific application of the present invention, a controller (such as a DSM Center and/or dynamic spectrum manager) to obtain a unique equipment identifier (for example, a serial number) or other pertinent information from a remote DSL modem or the like and to pair that unique equipment identifier (UEI) with the telephone number (TN) assigned to the loop on which the remote modem is operating. Embodiments of the present invention can be used to request information available from a remote modem, without requiring modem retraining and/or other interruption of DSL service. Moreover, embodiments of the present invention provide ways to facilitate searching for the correct UEI/TN pairing when the expected number pairing is not found initially.

As described in more detail below, a controller such as a DSM Center implementing one or more embodiments of the present invention can collect and update information on remote modems and line operation and characteristics without requiring retraining or other disruption of DSL service to a user whose modem is providing the information. One or more embodiments of the present invention can be part of or implemented in or by a controller (for example, a dynamic spectrum manager or DSM Center). The controller can be or include a computer-implemented device or combination of devices that collect and analyze appropriate operational data. Information such as serial numbers and/or other UEIs obtained using the present invention can be paired with the remote modem's telephone number and subsequently be used in evaluating system performance. The controller can be located anywhere. In some embodiments, the controller resides in the DSL CO (central office), while in other cases a transmitter may be operated by a third party located outside the CO. The structure, programming and other specific features of a controller usable in connection with embodiments of the present invention will be apparent to those skilled in the art after reviewing the present disclosure.

The following examples of embodiments of the present invention will use ADSL systems as exemplary communication systems. Within these ADSL systems, certain conventions, rules, protocols, etc. may be used to describe operation of the exemplary ADSL system and the information and/or data available from users and/or equipment on the system. However, as will be appreciated by those skilled in the art, embodiments of the present invention may be applied to various communication systems, and the invention is not limited to any particular system. The present invention can be used in any data transmission system for which information about the identification data discussed herein would be valuable.

Various network-management elements are used for management of ADSL physical-layer resources, where a network-management framework consists of one or more managed nodes, each containing an agent. The managed node could be a router, bridge, switch, remote ADSL modem or other point in the system. At least one NMS (Network Management System) monitors and controls managed nodes and is usually based on a common server or other computer. A network management protocol is used to exchange management information and data. The unit of management information is an object. A collection of related objects is defined as a Management Information Base (MIB).

FIGS. 1 shows an embodiment of the present invention in connection with a DSL system generally in accordance with a reference model according to the G.997.1 DSL standard (G.ploam), which is incorporated by reference herein in its entirety for all purposes. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+(G.992.5) and the G.993.x emerging VDSL standards, as well as the G.991.1 and G.991.2 SHDSL standards, all with and without bonding. This model is well known to those skilled in the art.

The G.997.1 standard specifies the physical layer management for ADSL transmission systems based on the clear embedded operation channel (EOC) defined in G.997.1 and use of indicator bits and EOC messages defined in G.992.x standards. Moreover, G.997.1 specifies network management elements content for configuration, fault and performance management. In performing these functions, the system utilizes a variety of operational data that is available at an access node (AN).

In the exemplary system of FIG. 1, user terminal equipment 110 is coupled to a home network 112, which in turn is coupled to a network termination unit (NT) 120. NT 120 includes a remote modem or ATU-R 122 (for example, a transceiver defined by one of the ADSL standards) or any other suitable network termination modem, transceiver or other communication unit. Typically the ATU-R 122 is a remote modem that has one or more unique identifiers, such as a serial number, MAC address, Ethernet address, etc. NT 120 also includes a management entity (ME) 124 that can be any suitable hardware device, such as a microprocessor, microcontroller, or circuit state machine in firmware or hardware, capable of performing as required by any applicable standards and/or other criteria. ME 124 collects and stores operational data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a DSL system is coupled to an ATU-C or DSLAM in a CO or other appropriate location (reference will be made to a DSLAM in discussing embodiments of the present invention, but the invention is not limited to just DSLAMs for implementation, as will be appreciated by those skilled in the art). In FIG. 1, DSLAM 142 is located at an access node (AN) 140 in a CO 146. ATU-R 122 and DSLAM 142 are coupled together by a loop 130, which in the case of ADSL typically is a telephone twisted pair that also carries other communication services and has a telephone number specifically assigned to it. The DSLAM 142 knows the telephone number assigned to the loop 130 over which the DSLAM 142 and remote modem 122 transmit. Communications may be sent to remote modem 122 by identifying and using the telephone number of the loop to which the remote modem 122 is connected.

Another ME 144 likewise maintains an MIB of operational data pertaining to DSLAM 142. The AN 140 may be coupled to a broadband network 170 or other network, as will be appreciated by those skilled in the art.

Several of the interfaces shown in FIG. 1 may be used for determining and collecting operational data (which includes performance data and/or other information). For example, the Q-interface 155 provides the interface between the NMS 150 of the operator and ME 144 in AN 140. All of the parameters specified in the G.997.1 standard apply at the Q-interface 155. The near-end parameters supported in ME 144 are derived from DSLAM 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, an operations, administration and maintenance (OAM) channel and a suitable protocol can be used to retrieve the parameters from ATU-R 122 when requested by ME 144. Similarly, the far-end parameters from DSLAM 142 can be derived by either of two interfaces over the U-interface. Indicator bits and EOC messages, which are provided at the PMD layer, can be used to generate the required DSLAM 142 parameters in ME 122 of NT 120. Alternately, the OAM channel and a suitable protocol can be used to ret parameters from DSLAM 142 when requested by ME 124.

The G.997.1 standard specifies an optional OAM communication channel across the U-interface. If this channel is implemented, ATU-C (DSLAM) and ATU-R pairs may use it for transporting physical layer OAM messages. Thus, the transceivers 122, 142 of such a system share various operational data maintained in their respective MIBs.

More information can be found regarding ADSL NMSs in Technical Report TR-005, entitled "ADSL Network Element Management" from the ADSL Forum, dated March 1998, which is incorporated herein by reference in its entirety for all purposes. Also, Working Text WT-87 (Rev. 6), entitled "CPE WAN Management Protocol" from the DSL Forum, dated January 2004 is incorporated herein by reference in its entirety for all purposes. Finally, Working Text WT-082v7, entitled "LAN-Side DSL CPE Configuration Specification" from the DSL Forum, dated Jan. 5, 2004 is incorporated herein by reference in its entirety for all purposes. These documents address different situations for CPE side management.

As will be appreciated by those skilled in the art, at least some of the parameters described in these documents can be used in connection with embodiments of the present invention. Moreover, at least some of the system descriptions are likewise applicable to embodiments of the present invention. Various types of operational data and information available from an ADSL NMS can be found therein; others may be known to those skilled in the art.

Figure 2:
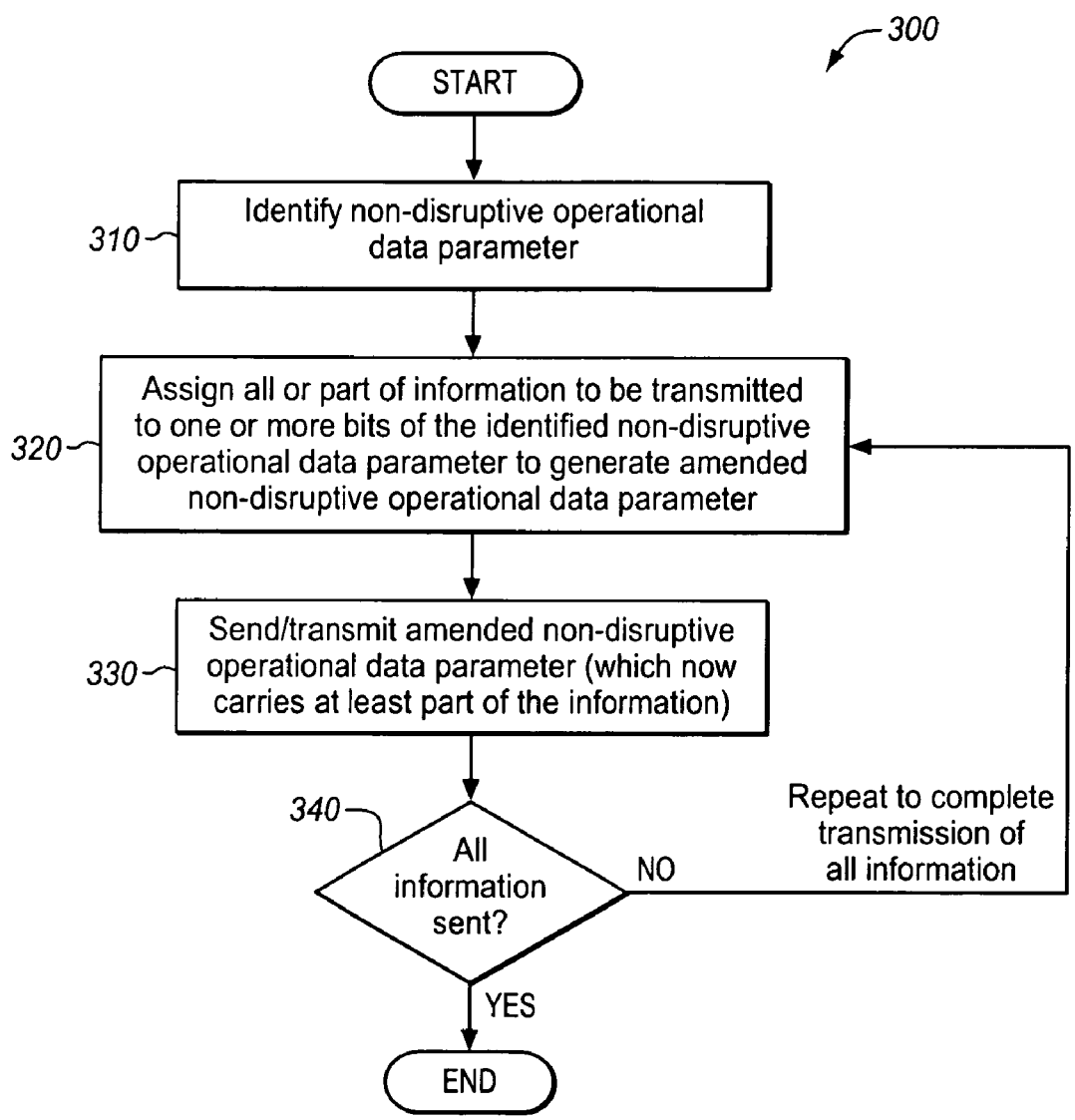
FIG. 2 is a flow diagram of a method of obtaining information from a DSL system component, according to one or more embodiments of the present invention.

One embodiment of the present invention provides a method of transmitting information from a DSL system component that typically uses one or more operational data parameters to report operational data without disrupting normal operation of the DSL system. As seen in FIG. 2, the method 300 includes step 310 identifying a non-disruptive operational data parameter. Generally, a non-disruptive parameter is a parameter from which one or more bits can be requisitioned (1) to transmit data/information different from the information that the parameter normally would carry and (2) without disrupting normal operation of the DSL system. At step 320, at least part of the information is assigned to one or more bits of the non-disruptive operational data parameter in a manner that avoids disrupting normal operation of the DSL system. The assignment of the information bits generates an amended operational data parameter. At step 330, the amended operational data parameter comprising at least part of the information is then sent. If not all of the information is sent, then decision 340 allows for the method to repeat itself to complete transmission of all of the information.

Figure 3:
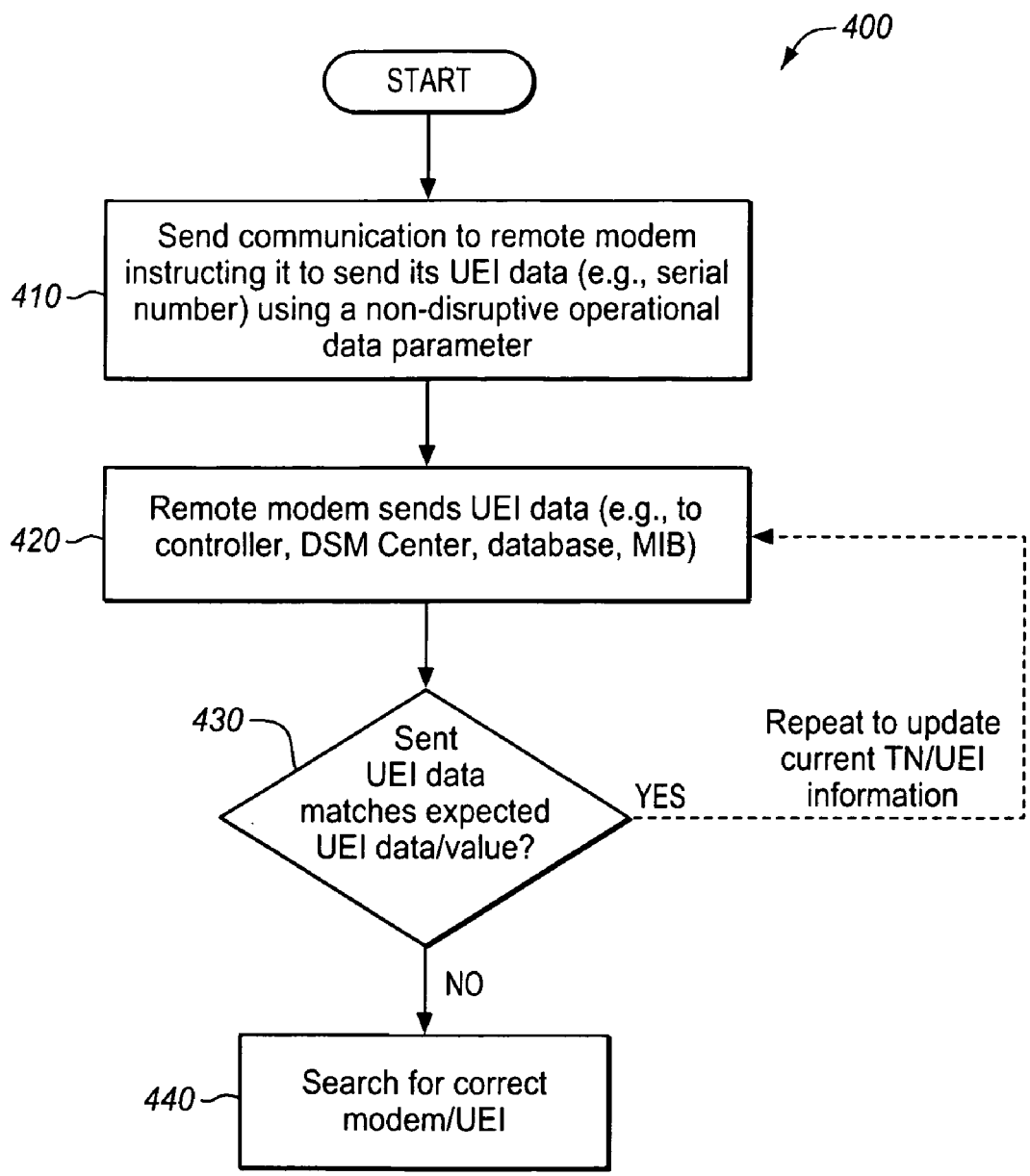
FIG. 3 is a flow diagram of a method of obtaining UEI information from a remote modem in a DSL system, according to one or more embodiments of the present invention.

In another embodiment of the present invention, one example of which is shown in FIG. 3, UEI/TN pairing information is sought from a remote modem (that does not know its telephone number) coupled to a DSL line associated with a telephone number known to the service provider. The UEI sought may be a serial number, for example. The method 400 begins at step 410 with the remote modem being sent a communication (for example, by a controller such as a DSM Center), instructing the remote modem to send its UEI data using a non-disruptive operational data parameter. The non-disruptive operational data parameter may be an unused operational data parameter or a parameter in which one or more bits may be requisitioned without disputing normal operation of the DSL system. At step 420, the remote modem then sends its UEI information/data. The UEI data may be sent directly to a controller or may be sent to another DSL system component, such as an MIB or database from which the data may later be collected. Where the non-disruptive operational data parameter selected by the remote modem is an unused operational data parameter, the parameter may be one associated with the remote modem's fast mode operation or interleaved mode operation, as described in more detail below. After the UEI data has been sent, decision 430 may be used to compare the received UEI data to an expected UEI value. Where the two do not match, a search may be conducted at 440.

In the method of FIG. 3, the communication to the remote modem at 410 may be a communication from an ATU-C modem to an ATU-R. In this example, the ATU-C may send the telephone number associated with the DSL line connecting the ATU-C and ATU-R. The ATU-R (remote modem) then pairs its UEI data to the telephone number sent by the ATU-C and sends the pairing back to the ATU-C (or a controller such as a DSM Center).

In some of the embodiments of the present invention disclosed herein, a controller 180 may want to learn, confirm and/or update data and/or information known to a system component, such as a modem, which data and/or information is not readily available using the NMS of the DSL system. For example, as seen in FIG. 4, controller 180 may want to learn, confirm and/or update a UEI/TN pairing for loop 130 using, for example, the serial number of remote modem 122, to either discover a pairing that currently is unknown, or to see whether the modem's pairing matches a pairing recorded in the controller's UEI/TN database 260 (the "expected UEI/TN pairing").

Figure 4:
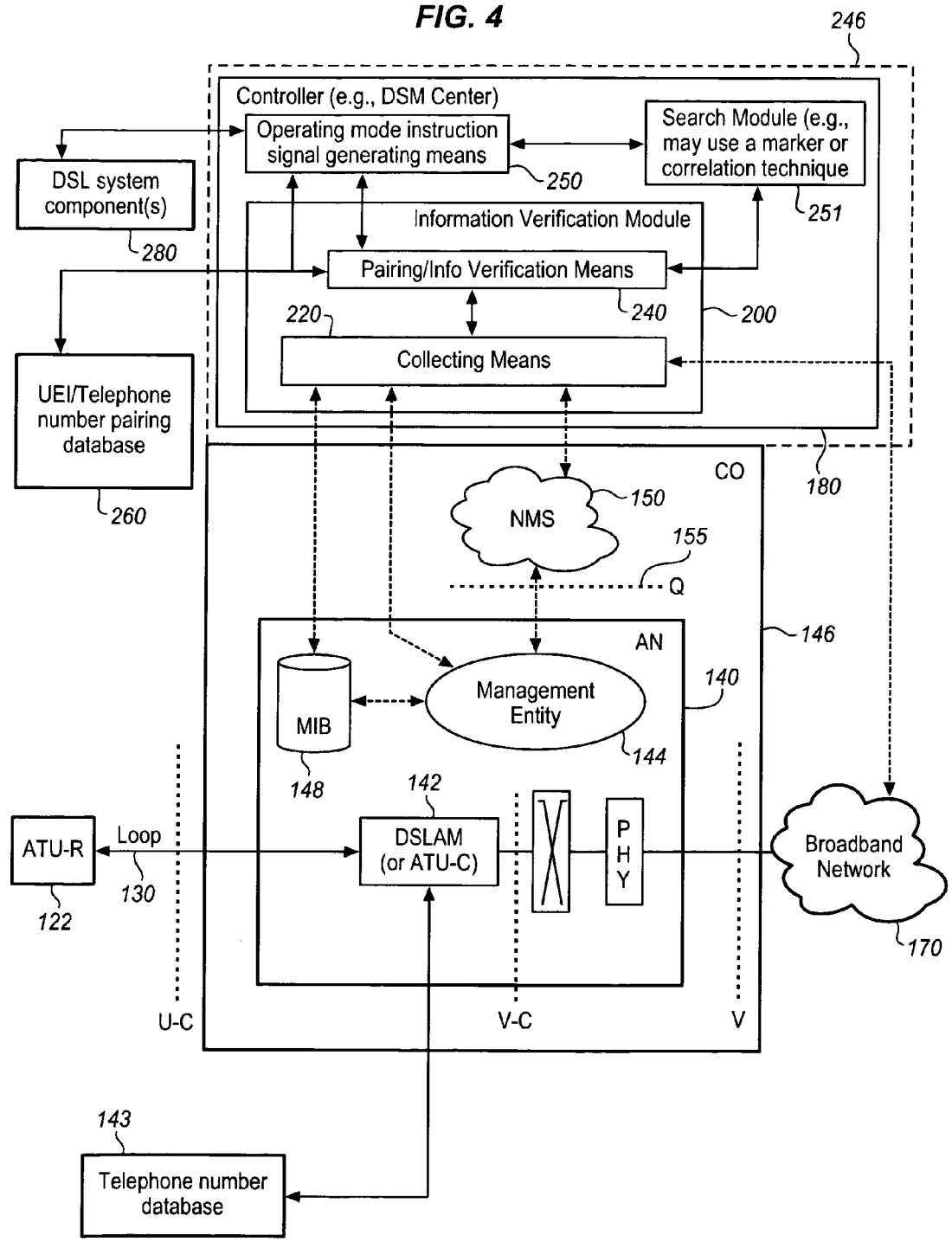
FIG. 4 is a schematic block diagram of one embodiment of the present invention in a DSL system, including a controller used to collect information from DSL components according to one or more embodiments of the present invention.

The controller 180 of FIG. 4 includes an instruction signal generating means 250, which can be used to instruct a DSL system component such as an ATU-R or ATU-C to send certain information either directly to the controller 180 or to another location, such as MIB 148. The instruction signal generator 250 is coupled to those DSL system components 280. Controller 180 also has access to a TN/UEI pairing database 260, which is shown in FIG. 4 as being external to the controller 180, though this is not required. Controller 180 uses an information verification module 200 to verify information the controller 180 receives, though such verification and the use of such a module 200 likewise is not required. When used, module 200 can include means 220 for collecting the information sent by one or more DSL system components from which information is sought, as well as other system information, including operational data where appropriate. An information verification means 240 can compare the collected information from means 220 with expected UEI and/or other values and/or data from database 260. When UEI or other data sent by a DSL system component does not match expected data, information and/or values, the controller 180 can conduct a search using search module 251. The search module can use various techniques for verifying, finding and/or correcting data, including, for example, a marker and/or correlation technique.

In some embodiments of the present invention, the controller 180 and other elements of the present invention may be implemented in a computer such as a PC, workstation or the like. For example, the collecting means 220 and verification means 240 may be software modules, hardware modules or a combination of both, as will be appreciated by those skilled in the art. Likewise, the instruction signal generating means 250 and search modules also may be software modules, hardware modules or a combination of both, as will be appreciated by those skilled in the art. For management of large numbers of lines, databases may be introduced and used to manage the volume of data generated by the lines (for example, databases 260, 143).

Using the present invention, the controller 180 instructs the DSLAM (or ATU-C) 142 to send a communication to the remote modem 122 coupled to loop 130, loop 130 being associated with a known telephone number (available, for example, from a database of telephone company phone numbers 143). The controller 180 can do this by sending the communication to the remote modem 122 via any suitable protocol (for example, TCP/IP and email, as shown in FIG. 1, for example) and the DSLAM 142, which knows the telephone number associated with the loop 130. The communication instructs the remote modem 122 to send its serial number or other UEI (again, others might include a MAC address, an Ethernet address or some other equivalent medium access number).

There are several ways the modem 122 can send the requested UEI information. Preferably, the remote modem 122 sends its UEI information to the controller 120 (either directly or via an intermediary, such as an MIB or other NMS element) using a non-disruptive parameter. In one embodiment of the present invention, the modem 122 replies by sending its UEI to the controller 180 using an unused operational data parameter, that is a parameter that is carrying no useful data during normal operation at the time its bit(s) is/are requisitioned. For example, from the ATU-C side of the loop, various types of operational data can be collected. Some of these parameters are used at all time, for example:

DNNMR (Downstream noise margin): Extra power being used in addition to the minimum power needed for achieving a target performance in downstream.

DNRC (Downstream relative capacity): The ratio between current data rate and maximum attainable data rate of the downstream.

DNPWR (Downstream power): Total power used for downstream transmission.

DNATEN (Downstream attenuation): The difference between total transmit power from ATU-C and the total receive power at ATU-R.

UPNMR (Upstream noise margin): Extra power being used in addition to the minimum power needed for achieving a target performance in upstream.

UPRC (Upstream relative capacity): The ratio between current data rate and maximum attainable data rate of the upstream.

UPPWR (Upstream power): Total power used for upstream transmission.

UPATEN (Upstream attenuation): The difference between total transmit power from ATU-R and the total receive power at ATU-C.

DMTBITS: Number of bits being used in each DMT tone. In some cases, as will be appreciated by those skilled in the art, some or all of these parameter values can be used for non-parameter reporting without disruption of the DSL line and system operation. For example, one or more bits of a single operational data parameter might be used to convey a single alpha-numeric value to a controller.

Other parameters are used selectively, depending on whether the remote modem is operating in fast mode or interleaving mode, which are operational modes well known to those skilled in the art. When a remote modem is in its fast mode operation, or "F-mode" operation, the interleaved mode parameters are unused. Similarly, when a remote modem is in its interleaved mode operation, or "I-mode" operation, the fast mode operational data parameters are unused. Some of those mutually exclusive parameters are (in pairs):

DNCURFBR (Downstream current fast buffer bitrate)

DNCURIBR (Downstream current interleaved buffer bitrate)

DNMAXAFBR (Downstream maximum attainable fast buffer bitrate)

DNMAXAIBR (Downstream maximum attainable interleaved buffer bitrate)

DNCELLSF: Rolling count of ATM cells transmitted on downstream—F-mode.

DNCELLSI: Rolling count of ATM cells transmitted on downstream—I-mode.

UPCURFBR (Upstream current fast buffer bitrate)

UPCURIBR (Upstream current interleaved buffer bitrate)

UPMAXAFBR (Upstream maximum attainable fast buffer bitrate)

UPMAXAIBR (Upstream maximum attainable interleaved buffer bitrate)

UPCELLSF: Rolling count of ATM cells transmitted on upstream—F-mode.

UPCELLSI: Rolling count of ATM cells transmitted on upstream—I-mode.

In some cases, the unused parameter of a pair will be zero (such as the bitrate in an unused operational mode), while in other cases (such as the parameters dealing with ATM cell counts) the unused parameter's value may be non-zero, but it is not used by operators for reporting data.

As noted above, some parameters are used only when the remote modem operates in its fast operational mode while other parameters are used only when the modem operates in its interleaved operational mode.

Thus, where the modem 122 seeks to send its serial number and/or other UEI data to the controller 180, and the modem 122 is operating in its F-mode, the modem 122 may send that data using one or more of the unused downstream I-mode operational data parameters, for example DNCURIBR, DNMAXAIBR or DNCELLSI. As described in connection with another embodiment of the present invention below, one or more other non-disruptive operational data parameters might be used to convey the UEI data to the controller.

The controller 180 can then collect the UEI information from the MIB 148 or any other operational data source to which the modem sends or otherwise provides its operational data parameters (one of which will contain the UEI information). Since the remote modem 122 only uses either the fast or interleaved mode, but not both, during a given time period, the parameters relating to the unused data mode are zero or otherwise useless data. Thus, the remote modem 122 can append its UEI data (or any other data sought by the controller 180) to one of the unused parameters and send that requested data to the controller 180.

At least two types of follow up operation may be required and/or desired for the controller—verification of a UEI/TN or finding the correct UEI/TN when an initial pairing is wrong or does not operate correctly.

In verifying a UEI/TN, the controller may use one or more of several techniques. In one technique, a correlation methodology can be employed. According to one embodiment of the present invention, the controller 180 collects a set of data from the ATU-R side of loop 130 using controller-defined data files that are delivered over the internet or via any other appropriate method. Likewise, a set of data can be collected from the ATU-C side of loop 130 as well. The data set of a line collected from ATU-C side can be referred to as the "dataC" set, while the data set of the same line collected from ATU-R side can be referred to as the "dataR" set. The dataC set will contain the phone number of the line, while the dataR set will contain the serial number and/or other UEIs of the ATU-R modem. Each line will thus be producing a dataC set from each DSLAM data collection, and be producing a dataR set from each controller-defined data file collection. If the dataC set and dataR set were collected around same time, the reported bit distribution, margin, power, attenuation, etc. would be the same or very close in terms of their operational data parameter values. A correlation of dataR sets can be done with regard to the dataC set of interest, looking for the best matching dataC and dataR sets. The sets with the highest correlation should match/verify the UEI/TN produced by the initial inquiry from the controller.

Figure 5:
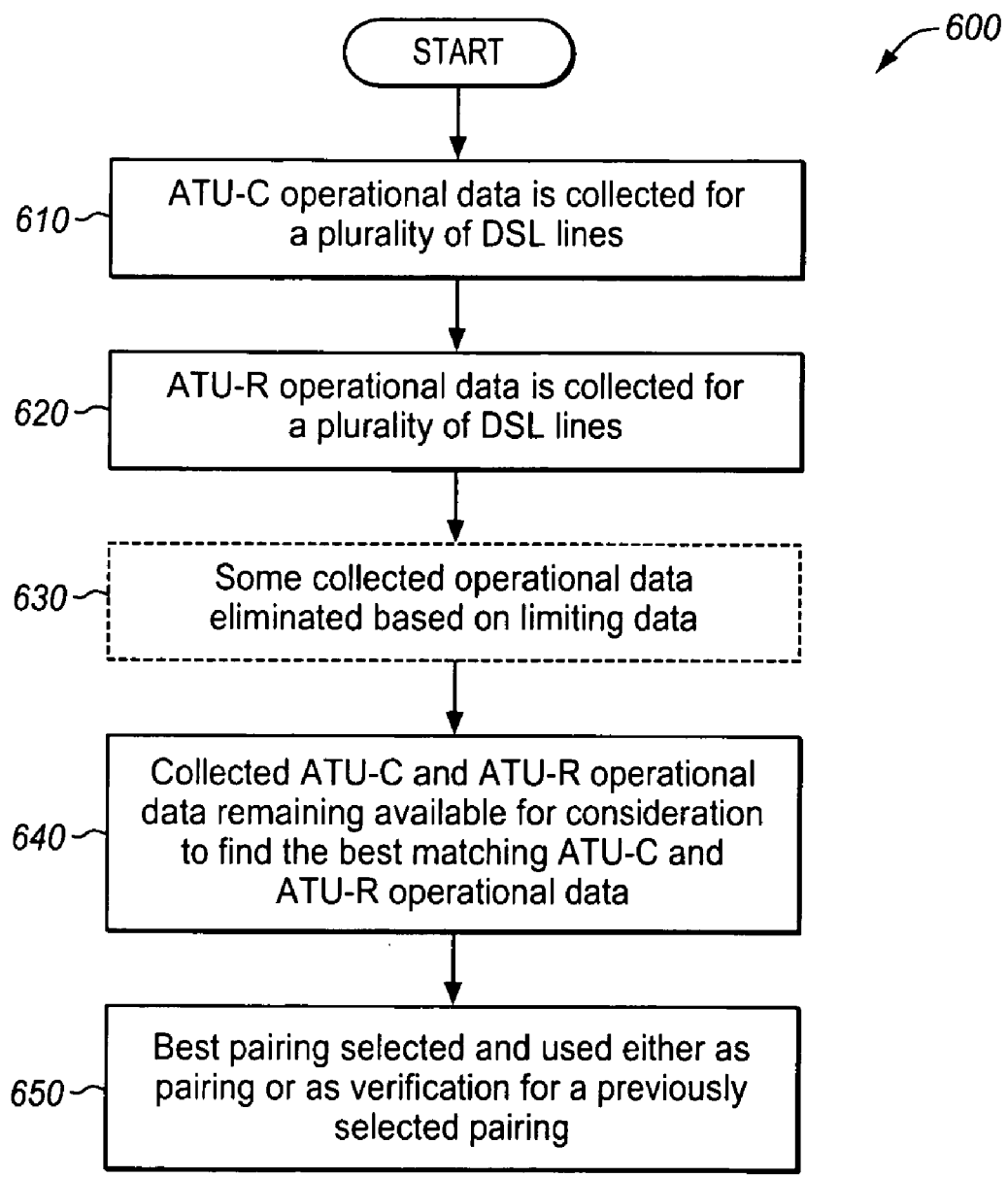
FIG. 5 is a flow diagram of a correlation method for finding and/or verifying information sent by a remote modem or other DSL system component, according to one or more embodiments of the present invention.

If the remote modem 122 fails to send a desired UEI, the correlation technique described above may be used as a method for finding the original pairing, one example of which is shown in FIG. 5. In some situations, however, there will be numerous dataC and dataR sets from many different lines (in some cases, millions of different lines). One way to deal with very large numbers of data sets (where straightforward correlation is impractical) is to reduce the number of candidate modems. The data correlation method can be reasonably practical if any other information such as an IP address or ISP login name that was reported in a dataR set is helpful in eliminating candidates for correlation. For example, if a given IP address is used only in Northern California, then a dataR set with that IP address only needs to be compared to dataC sets with telephone numbers that correspond to Northern California. In this way, the controller can reduce the number of candidate dataR sets that can be the matching one for a given dataC set. In FIG. 5,, for example, ATU-C operational data is collected at 610 for a plurality of DSL lines at step 610. At 620, ATU-R operational data is collected for a plurality of DSL lines. Where a large number of DSL lines are considered, some of the operational data can be eliminated optionally at 630 based on limiting data. The collected ATU-C and ATU-R data remaining available for consideration is then correlated at 640 to find the best matching ATU-C and ATU-R operational data. At 650 the best pairing is selected and used either as the pairing or as verification for a selected pairing.

In another embodiment of the present invention, a "marker" can be inserted into one or more of the remote modem's data fields. For example, along with instructing the remote modem 122 to send its UEI data in whatever format used, the controller 180 also may instruct the remote modem 122 to report an impossibly high rate, such as 256 Mbps, as its maximum data rate. This allows the controller 180 to search records of potentially millions of DSL or other lines and find very few data reports (or a single report) for any modems reporting 256 Mbps data rates. Obviously, other parameters and parameter values can be used as markers, as will be appreciated by those skilled in the art.

Markers of the type noted above also can be used in situations where the controller 180 does not receive the correct data and knows that it has to search for the remote modem 122. For example, where the received UEI does not match the "expected" UEI in the controller's database or other records, the controller 180 can use the marker methodology to simplify its search for the correct modem.

In another embodiment of the present invention, a non-disruptive operational data parameter may still carry the UEI data, even though that parameter is in use by the modem for reporting the modem's operational data (which may include performance data as well). For example, some operational data parameters are formatted in a manner that allows one or more bits of the reported operational data to be changed without forcing retraining or other disruption to the communication system. Essentially, the controller requisitions one or more relatively insignificant bits of the operational data parameter and instructs the modem to send its UEI data using those bits.

In this embodiment, where the controller 180 seeks to learn or verify the UEI/TN pairing of the remote modem 122, modem 122 may send its UEI data in a series of data packets via loop 130. These data packets again are directed to and may be stored in the MIB 148 of the ME 144 and/or the NMS 150. Where a modem is sending its serial number to the controller of an ADSL system, a remote modem serial number typically can be expressed in 48 bits (12 hexadecimal characters or 6 bytes). To send the 48 bits of identifying information from the ATU-R 122 to the DSLAM 142, the present invention can use several bits of an operational data parameter, such as the code violations (CV) count, which will not disrupt the operation/transmission of data between the DSLAM 142 and remote modem 122, but which may nevertheless corrupt the exact value(s) of the operational data parameter reported to the MIB 148.

For example, the two least significant decimal digits of the CV count might be requisitioned for communicating a serial number of the remote modem 122, inserting one hex digit (a value from 0-15) of the UEI into each reported CV count. In such an example, 4 bits of the serial number are conveyed via each CV count and represent one hexadecimal digit of the 12 hexadecimal digits in the remote modem serial number. The system can use the count reported (which are reported as integers) and convert 0-15 into a 4-bit quantity (the last two decimal digits of the reported value when the modem is commanded into serial number report mode will not exceed 15), using the last two (least significant) decimal digits of the CV count. In this way the system can carry 4 bits of information without problem. As noted above, this also could be the unused buffer's CV count (F-mode or I-mode) or, if requisitioning is used, the used buffer's CV count in which case any real code violations would not be reported while the modem does this. Thus the decimal digits other than the two least significant digits still can be used to convey CV information. As an example, to embed the value "12" in a given CV count, the following alteration may be done:

| Original CV | Altered CV |
| --- | --- |
| 0 | 12 |
| 11 | 12 |
| 156 | 112 |
| 2341 | 2312 |

Because the data packet being sent is substituted in lieu of relatively insignificant bits of the CV count value, the alteration to the actual CV count is non-disruptive (that is, not substantial enough to trigger a retraining or other disruption in data transmission). Thus, by making a minor alteration to 12 consecutive CV reports, which may be sent every 15 minutes (3 hours total transmission time for the serial number) or sent together at the same time (for example, because a DSLAM can access CV reports of any 15-minute window within the last 8 hours, and thus the ATU-R can alter CV counts of the last 12 consecutive windows), the remote modem 122 is able to send its 48 bit serial number to the NMS MIB 148. In order to reduce the impact on data transmission even further, the controller 180 may wait until the remote modem's transmitted packet count is sufficiently low and/or when there is a lower probability of disruption (for example, at the remote modem's local time of 3 a.m.) to conduct the matching/verification/updating function. The remote modem 122 may begin attaching the 4 bit data packets immediately after receiving the instruction from the controller 180 or at an appropriate start time given to the remote modem 122 as part of the controller's instructions. Once the controller 180 has collected all of the relevant data packets, the controller 180 then "assembles" the serial number from the received data packets.

Again, the controller 180 can check the UEI/TN pairing provided by the DSLAM 142 to determine whether these data match the expected pairing. Where the expected pairing is not found, some embodiments of the present invention described above (for example, the use of a correlation method and/or one or more "flags" or "markers") allow the controller 180 to conduct a search to locate the correct data.

The controller 180 may set up a "qualifier" or "flag" in the remote modem's performance report. For example, in its instructions to the remote modem 122, the controller 180 may also initially instruct the remote modem 122 to turn "on" or use a flag, such as reporting a specific extraordinary and/or impossible performance quantity (for example an excessive data rate of 256 Mbps or other remarkable characteristic(s)) during a relevant time period. The controller 180 then can search user performance reports or the like via the DSLAM records (for example, within the DSLAM MIB 148) to find any users whose loop operational data contain the "qualifier" or "flag" reported by the subject remote modem and telephone number. Such a limited search likely will yield the correct telephone number/serial number pairing in short order.

If the controller commands only one modem at a time to turn "on" a flag, then the controller will be able match telephone number and UEI just by finding the line whose dataC has turned on a flag. The serial number may be known to the controller (such as a DSM Center) via the internet path, and the phone number is part of dataC. This method, however, might not be practical when millions of lines need to have TN/UEI matches done in a short time. In such cases, flags will be used only to find set of lines that are reporting SN via operation/performance data, and the 3-hour serial number transmission (or any other methods such as using unused performance field) then can be used to find the exact matching.

There may be many existing remote DSL modems that cannot report a serial number or other UEI via the CV count or other operational data parameter. However, these modems do not require UEI identification by the DSM center because they do not report new information over the alternate non-element-management-system path to the controller (for example, a DSM center). Thus, these lines would not pass the qualifier test and need not be searched. That is, if a modem is not reporting dataR packets, then the controller has no need to correlate or pair with dataC because there is no dataR so the controller has only the dataC.

The same idea can be applied with the roles of ATU-R and DSLAM switched. The telephone number can be sent from DSLAM to ATU-R by utilizing a non-disruptive operational data parameter (for example, the upstream CV field that is transmitted from DSLAM to ATU-R or a fast or interleaved mode parameter not in use). As will be appreciated by those skilled in the art, the processes and/or methods described above are merely mirrored to match the transmitted telephone number to a known serial number or other UEI. The controller obtains the data by collecting the ATU-R's data set(s) rather than the data of the ATU-C after transmission of the telephone number to the remote modem. Again, the non-disruptive operational data parameter may be all or part of a requisitioned parameter, such as the CV count, or may be an unused parameter, such as an F-mode or I-mode parameter for an unused mode of operation.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given herein.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
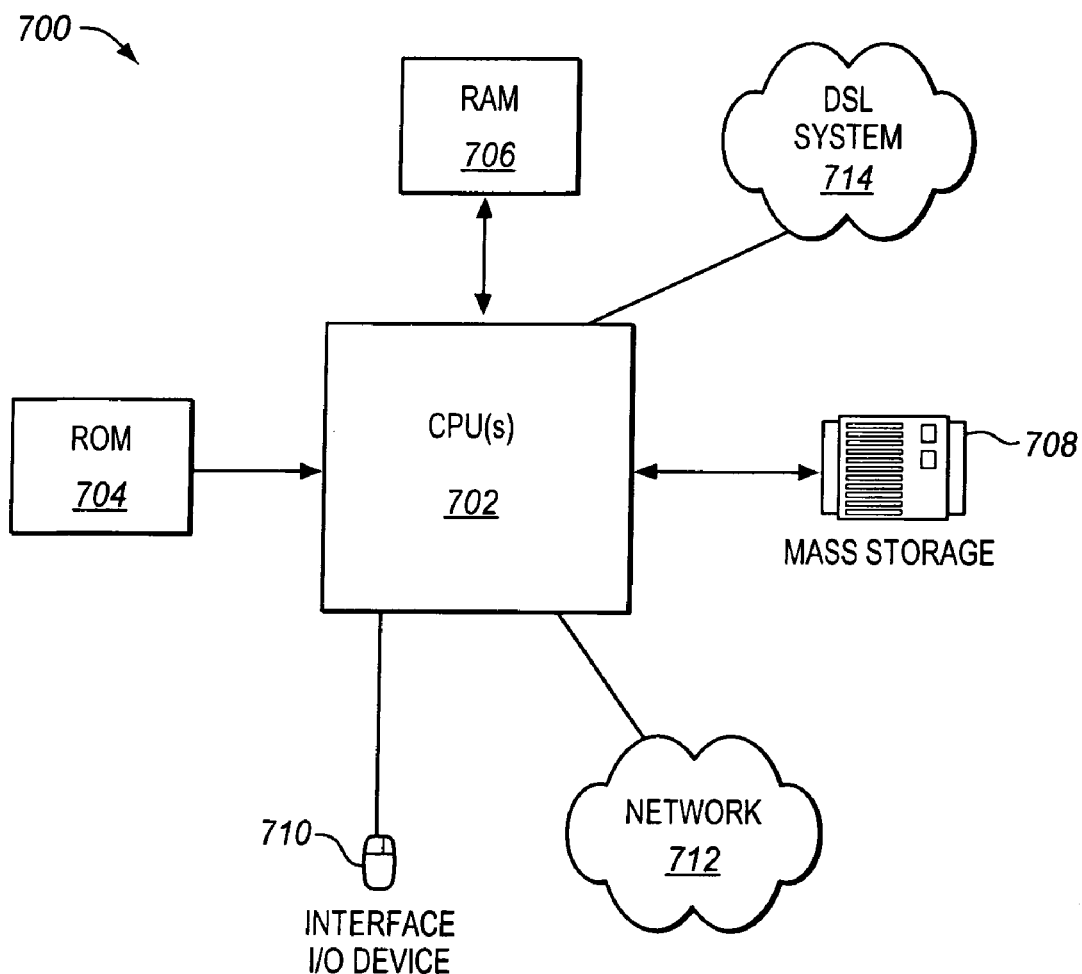
FIG. 6 is a block diagram of a typical computer system or integrated circuit system suitable for implementing embodiments of the present invention.

FIG. 6 illustrates a typical computer system that can be used by a user and/or controller in accordance with one or more embodiments of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable of the computer-readable media described above. A mass storage device 708 also is coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 also is coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 708 or 714 and executed on CPU 702 in conjunction with primary memory 706. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method comprising:
    obtaining, at a DSL (Digital Subscriber Line) system component, information to be sent to a recipient;
    determining whether a DSL system component is operating in a fast operational mode or an interleaved operational mode and selecting the other mode as an unused mode;
    selecting a system management operational data parameter of the unused mode from among a plurality of system management operational data parameters used to communicate management operational data on a physical layer management channel;
    assigning the information, at the DSL system component, to at least one bit of the selected operational data parameter in place of the information that the parameter normally would carry to generate an amended operational data parameter, the parameter being amended by containing the information assigned to the parameter;
    sending the amended operational data parameter using the physical layer management channel from the DSL system component to the recipient.

2. The method of claim 1 wherein the DSL system component is one of the following: a modem; an ATU-C (Asymmetric Digital Subscriber Line Transceiver Unit-Central); or an ATU-R (Asymmetric Digital Subscriber Line Transceiver Unit-Remote).

3. The method of claim 1 wherein the unused mode operational data parameter is an operational data parameter from which one or more bits can be requisitioned without disrupting normal operation of the DSL system.

4. The method of claim 1 wherein the information to be sent is at least one of the following: a telephone number; a UEI (Unique Equipment Identifier); a serial number; channel insertion loss information; or a number assigned by a controller in another command to the DSL system component.

5. The method of claim 1 wherein sending the amended operational data parameter to a recipient comprises sending the amended operational data parameter to a controller.

6. The method of claim 5 wherein the controller is a DSM (Dynamic Spectrum Management) Center.

7. The method of claim 6 wherein the amended operational data parameter is sent to the controller via a DSL system MIB (Management Information Base).

8. The method of claim 1 wherein assigning the information comprises assigning portions of the information to consecutive operational data parameters so that the information is sent using more than one consecutive operational data parameter and wherein sending comprises sending the more than one consecutive operational data parameters.

9. A controller for a DSL (Digital Subscriber Line) system, the controller comprising:
    means for instructing a DSL system component to transmit information to the controller using a system management operational data parameter of a physical layer management channel, wherein the component uses one or more physical layer operational data parameters of a DSL operational mode of the DSL system to report operational data over the physical layer management channel and wherein instructing the component to transmit information includes instructing the component to determine whether the DSL system component is operating in a fast operational mode or an interleaved operational mode and select the other mode as an unused mode, to identify an operational data parameter from the unused DSL operational mode and to assign at least part of the information to one or more bits of the identified operational data parameter in place of the information that the parameter normally would carry to generate an amended unused operational data parameter, the parameter being amended by containing the information assigned to the parameter;

means for collecting the amended operational data parameter sent by the DSL system component using the physical layer management channel and for retrieving the transmitted information therefrom.

10. The controller of claim 9 further comprising means for verifying the information transmitted by the component by comparing the transmitted information to expected information.

11. The controller of claim 10 further comprising a search module for searching for correct information when the information transmitted by the component does not match the expected information.

12. The controller of claim 9 wherein the controller is a DSM (Dynamic Spectrum Management) Center.

13. The controller of claim 9 wherein the controller is a computer system.

14. The controller of claim 9 wherein the component is a DSL modem.

15. The controller of claim 14 wherein the DSL modem is either an ATU-R (Asymmetric Digital Subscriber Line Transceiver Unit-Remote) modem or an ATU-C (Asymmetric Digital Subscriber Line Transceiver Unit-Central) modem.

16. The controller of claim 9 wherein the information transmitted by the component is a unique equipment identifier.

17. The controller of claim 9 wherein the component transmits the information to a DSL system MIB (Management Information Base) and further wherein the controller collects the information from the MIB.

18. A machine-readable medium having stored thereon instructions that, when executed by a processor, cause the processor to perform operations comprising:

obtaining information to be sent to a recipient;

determining whether a DSL system component is operating in a fast operational mode or an interleaved operational mode and selecting the other mode as an unused mode;

selecting a system management operational data parameter of the unused mode from among a plurality of system management operational data parameters used to communicate management operational data on a physical layer management channel;

assigning the information, at the DSL system component, to the selected operational data parameter in place of the information that the parameter normally would carry to generate an amended unused operational data parameter, the parameter being amended by containing the information assigned to the parameter;

sending the amended operational data parameter using the physical layer management channel from the DSL system component to the recipient.

19. The medium of claim 18 wherein the unused mode operational data parameter is an operational data parameter from which one or more bits can be requisitioned without disrupting normal operation of the DSL system.

20. The medium of claim 18 wherein sending the amended operational data parameter comprises sending the amended operational data parameter to a controller.

21. A controller for a DSL (Digital Subscriber Line) system, the controller comprising:

an information verification module to instruct a DSL system component to transmit information using a physical layer management channel to the controller using a physical layer operational data parameter as an amended operational data parameter, the physical layer management channel having a plurality of system management operational data parameters used to communicate management operational data on the channel, some of the parameters being used in a fast operational mode, some being used in an interleaved operational mode, and some being used in both operational modes, the operational data parameter for transmitting the information being selected as an operational data parameter of a currently unused operational mode of the DSL system component, the parameter being amended by assigning the information to be transmitted to the parameter in place of the information that the parameter normally would carry if the DSL component were using the unused operational mode; and a collecting module to collect the amended operational data parameter sent by the DSL system component using the physical layer management channel and to retrieve the transmitted information therefrom.

22. The controller of claim 21 wherein the information verification module comprises means for verifying the information transmitted by the component by comparing the transmitted information to expected information.

23. The controller of claim 21 further comprising a search module to search for correct information when the collected amended operational data parameter does not match expected information.

24. The controller of claim 21 wherein the information transmitted by the component is a unique equipment identifier.

25. The controller of claim 21 wherein the unique equipment identifier is a modem serial number.

26. The controller of claim 21 wherein the controller is a DSM (Dynamic Spectrum Management) Center.

* * * * *